Figure 1:
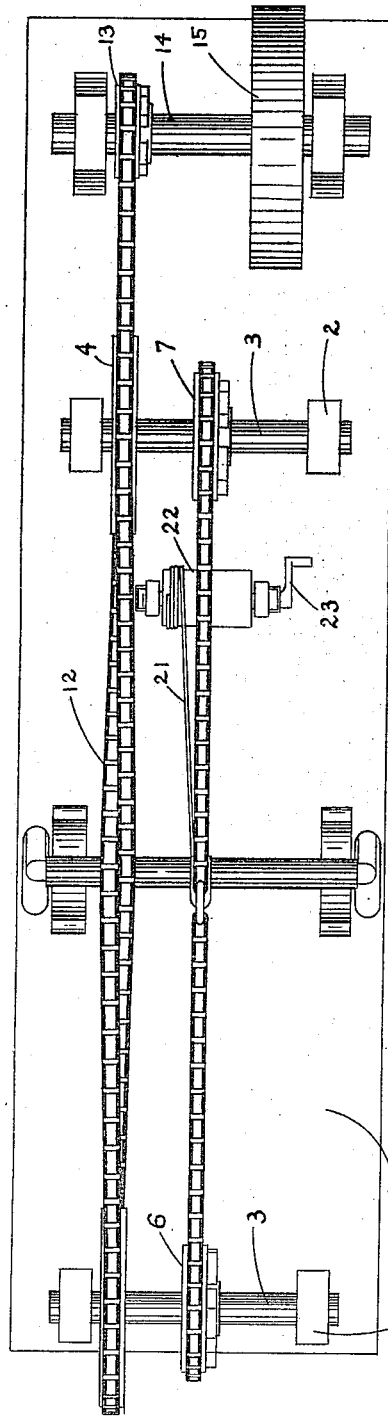

R. M. MOBIUS.
SEA POWER GENERATOR.
APPLICATION FILED MAR. 24, 1910.

962,651.

Patented June 28, 1910.

2 SHEETS—SHEET 1.

Witnesses:
F. M. Keeney.
Wm. F. K. DeBorde

Inventor.
Robert Max Mobius

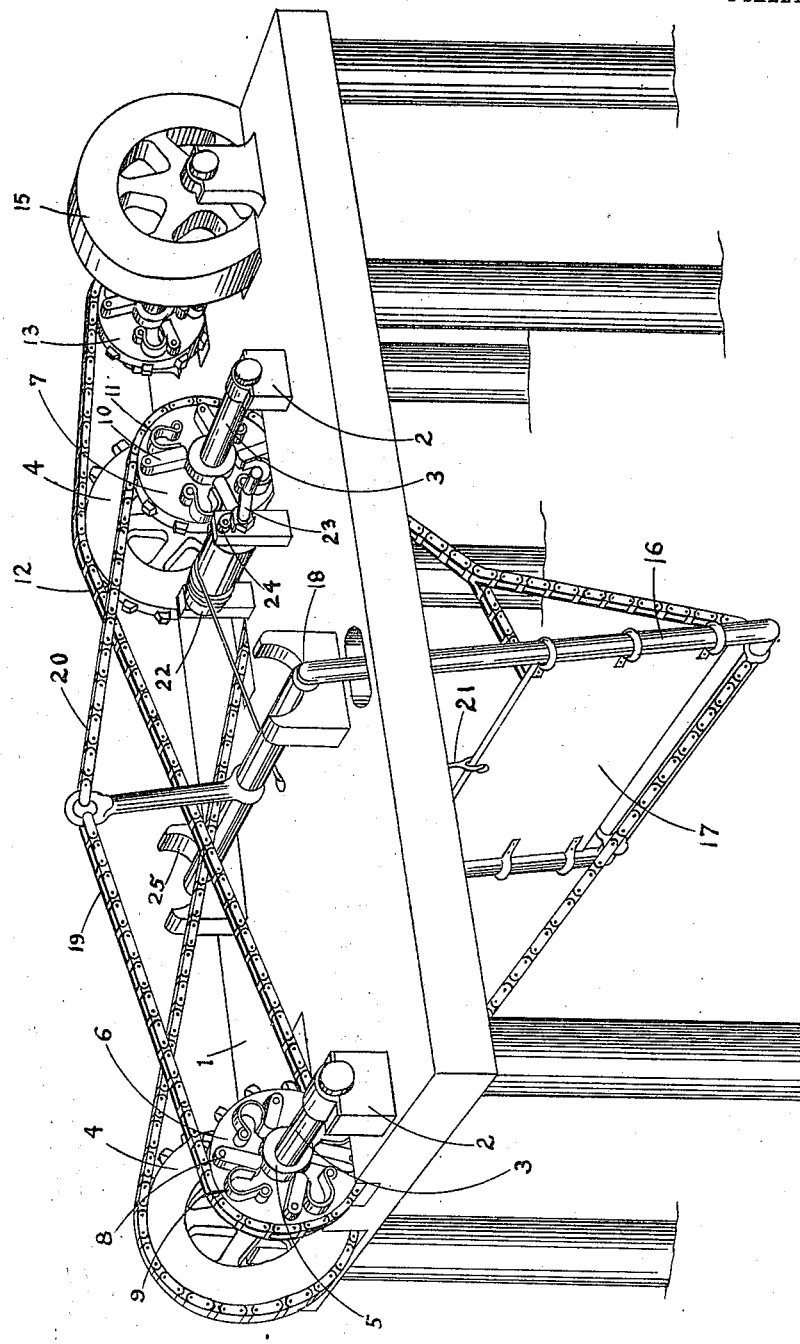

UNITED STATES PATENT OFFICE.

ROBERT MAX MOBIUS, OF SAN DIEGO, CALIFORNIA, ASSIGNOR TO F. K. DE BORDE, OF SAN DIEGO, CALIFORNIA.

SEA POWER-GENERATOR.

962,651.  Specification of Letters Patent.  Patented June 28, 1910.

Application filed March 24, 1910. Serial No. 551,266.

*To all whom it may concern:*

Be it known that I, ROBERT MAX MOBIUS, citizen of Canada, residing at San Diego, in the county of San Diego and State of California, have invented certain new and useful Improvements in Sea Power-Generators; and I do hereby declare the following to be a full, clear, and exact description of the invention, such as will enable others skilled in the art to which it appertains to make and use the same.

This invention relates to a sea power generator and has for its object the provision of improved means for developing power from the movement of seas, waves and tides, in a constant and regular manner, and to provide a device of great simplicity of design and durability with safety in use.

To attain these objects and advantages, the invention consists in certain details of construction and combination of parts, substantially as herein illustrated, described and claimed.

Other objects and advantages will become apparent from the detailed description which now follows.

In the accompanying drawings illustrating this device, corresponding parts in the several figures are denoted by the same reference numerals.

Figure 2:
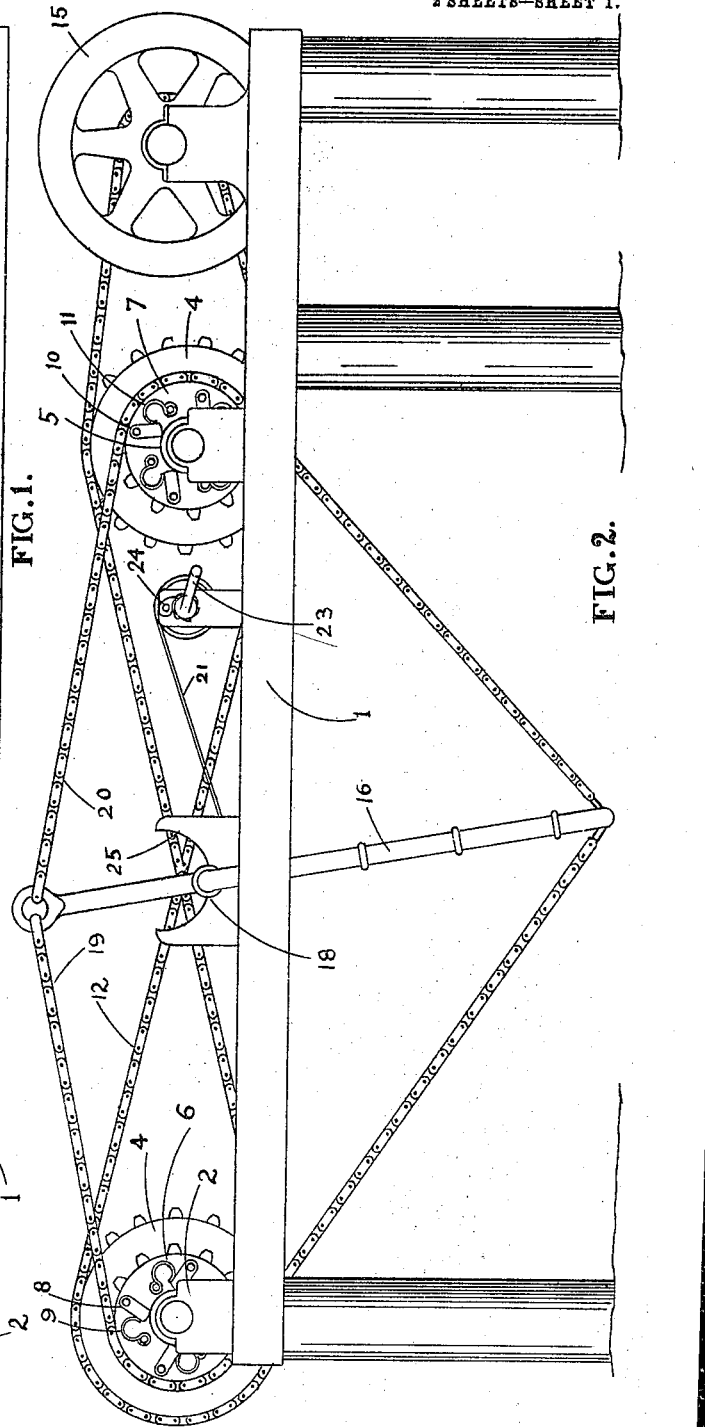

Figure 1 represents a plan view of a device embodying the principles of this invention. Fig. 2 represents a side elevation. Fig. 3 represents a perspective view.

Referring more particularly to the drawings, numeral 1 designates a platform mounted upon piling and having bearings 2 mounted thereon and carrying shafts 3, to which are attached sprocket wheels 4 and smooth pulleys 5. These shafts also carry loose sprocket wheels 6, and 7; the sprocket wheel 6 having ratchet pawls 8 and springs 9 that hold them in engagement with the smooth pulley. Sprocket wheel 7 has ratchet pawls 10 and springs 11 that hold them in engagement with the smooth pulley on the shaft. The ratchet pawls have round ends and are of sufficient length to bind and grip the smooth pulleys when rotated in the proper direction, and will release themselves when rotated in the opposite direction, the ratchet pawls being set to grip the pulleys when rotated in opposite directions, thus imparting motion to the shafts 3, and sprocket wheels 4. For the purpose of securing a more uniform speed of revolution, sprocket wheels 4 are made with heavy rims and are adapted to move chain 12 in a continuous direction with a uniform speed. Chain 12 is crossed between the sprocket wheels 4 and drives a ratchet wheel 13 upon the power shaft 14. To secure more uniform motion a heavy balance wheel 15 is mounted on shaft 14.

To secure power from the waves a frame 16 carrying an adjustable panel 17 and mounted in bearings 18 is adapted by means of sprocket chains 19 and 20, to drive sprockets 6 and 7, thus connecting the pendulum movement of the panel into mechanical power. Chains 19 and 20, after passing underneath the platform, are divided into two branches which connect with the lower corners of frame 16. The panel as shown may be constructed of wood or be made hollow of sheet metal, and of such weight that it is submerged to a depth sufficient to give the best results, but additional means for adjusting the panel are provided in a cable 21 which is secured to the center of the panel and passes up through the platform and over drum 22 which is provided with crank 23 and ratchet pawl 24, thus the panel may be withdrawn from the water entirely or may be adjusted to receive and transmit the greatest effective power possible with this device.

To prevent breakage from a sudden twisting movement of the waves, bearings 18 are made, as illustrated, with a large semicircular top 25, which allows the frame to rise and turn slightly and then resume its normal position again.

It is to be understood that the device as herein illustrated and described constitutes a single unit or power generator and the apparatus will usually be installed with a series of such units, connected to give continuous motion to a power shaft and of such size and proportions as may be deemed advisable. It is also to be understood that the invention is not limited to the use of sprocket wheels or chains for transmitting power, but different styles of pulleys and belts or chains may be employed for this purpose.

While the elements shown and described are well adapted to serve the purposes for which they are intended, the invention is not limited to the precise construction and forms as shown, but includes within its purview such changes in detail as may be employed to embody the principles of this invention.

I claim—

1. A device of the character described, comprising a platform mounted upon piling, bearings on the platform, a pendulum frame swinging from said bearings, a vertically adjustable panel mounted in the frame, means for securing adjustment of the panel comprising a cable, a drum over which the cable passes, a crank for winding the drum and a pawl engaging the shaft of the drum, and chains in combination with sprocket wheels and pulleys, substantially as shown.

2. A device of the character described, comprising a platform mounted upon piling, bearings upon the platform, a pendulum frame swinging from said bearings and adapted to disengage itself from said bearings, and semi-circular guides upon top of bearings for returning frame to position and chains in combination with wheels and pulleys and a power shaft, substantially as shown.

3. A device of the character described, comprising a platform mounted on piling, bearings upon the platform, a pendulum frame swinging from said bearings, chains secured to the top of the frame and passing over ratchet pulleys, to the bottom of the frame, a division of said chain into two branches which connect with the lower corners of the frame, and a panel mounted within said frame, in combination with pulleys, chains and a power shaft, substantially as shown.

4. The combination of a platform, bearings upon the platform, piles supporting the platform, a frame suspended from the bearings, a panel vertically adjustable within the frame, and made of a specific gravity sufficient to submerge the same to the proper depth in the water, chains attached to the frame and passing over pulleys, pulleys with friction pawls, shafts driven by the friction pawls, springs holding the pawls in engagement with smooth friction pulleys and means for transmitting the power from the friction driven shaft to a main power shaft substantially as shown.

In testimony whereof, I affix my signature, in presence of two witnesses.

ROBERT MAX MOBIUS.

Witnesses:
F. M. KEENEY,
WM. F. K. DE BORDE.